S. GIACOLETTO.
STEERING DEVICE.
APPLICATION FILED SEPT. 27, 1917.
1,303,289.
Patented May 13, 1919.
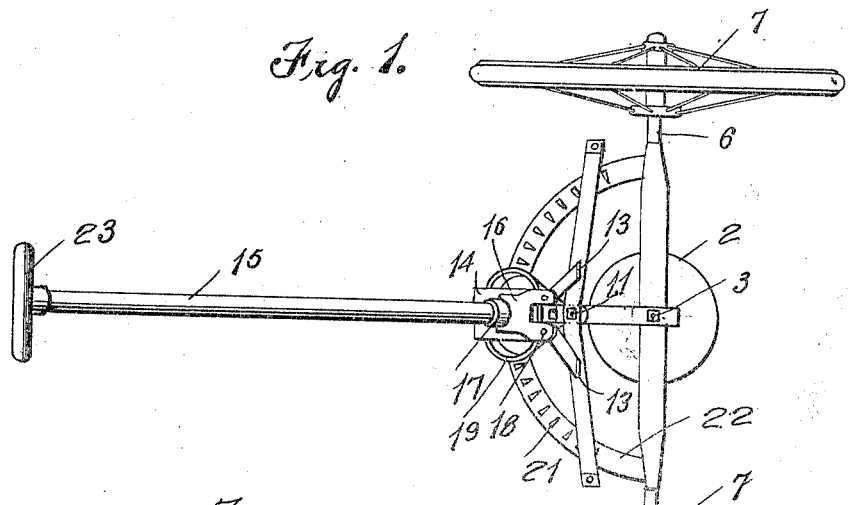
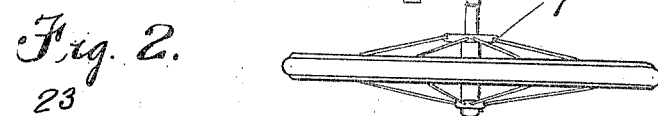
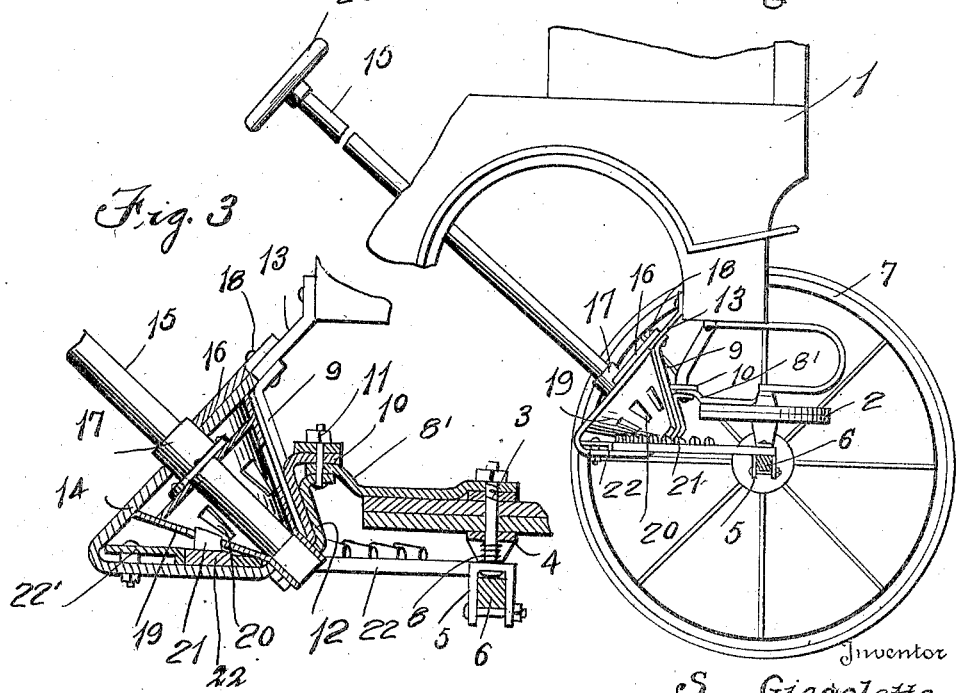
Inventor
S. Giacoletto

UNITED STATES PATENT OFFICE.

SAVINO GIACOLETTO, OF HANCOCK, MICHIGAN.

STEERING DEVICE.

1,303,289.  Specification of Letters Patent.  Patented May 13, 1919.

Application filed September 27, 1917. Serial No. 193,582.

*To all whom it may concern:*

Be it known that I, SAVINO GIACOLETTO, a citizen of the United States, residing at Hancock, in the county of Houghton and State of Michigan, have invented certain new and useful Improvements in Steering Devices; and I do hereby declare the following to be a full, clear, and exact description of the invention, such as will enable others skilled in the art to which it appertains to make and use the same.

This invention relates to improvements in a steering device and has for one of its objects the provision of a device of this character which can be readily and conveniently applied to a vehicle in which the front axle turns on a fifth wheel, so that the same can be turned in either direction by a steering post.

Another object of this invention is the provision of a segmental member secured to the axle adjacent each end and having teeth thereon for engagement with teeth upon a gear carried by the steering post, so that upon turning the steering post by an ordinary steering wheel the front axle is compelled to turn upon its fifth wheel.

A further object of this invention is the provision of a steering device of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts, as will be hereinafter more fully described and claimed.

For a complete understanding of my invention, reference is to be had to the following description and accompanying drawing, in which:—

Figure 1 is a top plan view of a steering device constructed in accordance with my invention, Fig. 2 is a side elevation of the same, Fig. 3 is an enlarged vertical sectional view illustrating the means of supporting a steering post with the cone gears thereon.

Referring in detail to the drawing, the numeral 1 indicates the body of a vehicle having connected thereto a fifth wheel 2. The plates forming the fifth wheel 2 are connected by a bolt 3 which extends through a supporting member 4 and connected to a substantially U-shaped clamp 5 which is secured to the front axle 6. The supporting member 4 has each end secured in any desired manner to the front axle adjacent the free ends thereof. The axle has journaled upon each end the wheels 7. Interposed between the clamp 5 and the supporting member 4 upon the bolt 3, is a coil spring 8 for the purpose of retarding the downward movement of the supporting member 4 in the direction of the axle, this movement being caused by the wheels passing over uneven ground.

A rearwardly extending arm 8' is secured to the bolt 3 upon the fifth wheel 2 for the purpose of supporting a gear housing 9. The gear housing 9 has struck therefrom an ear 10 which is secured to the arm 8' by means of a bolt 11. A reinforcing bracket 12 is secured to the housing 9 and to the under face of the arm 8' by means of the bolt 11. The gear housing 9 is supported at an angle by a bracket 13 secured to the body 1. The bottom wall of the housing 9 is bent upwardly to form a top wall 14 which is apertured to receive a steering post 15 and has secured thereon a plate 16 which engages a collar 17 surrounding the steering post 15 and is in turn secured to the bracket 13 by means of a bolt 18. The collar 17 has formed thereon a conical gear 19 provided with a plurality of teeth 20 that engage teeth 21 formed upon a segmental plate 22. The segmental plate 22 is sildable through the housing 9 and has its ends secured to the axle adjacent each free end thereof. A suitable stop 22' is secured to the bottom wall of the housing 9 and limits the rearward movement of the segmental member 22 within the housing and which guides the member 22 so that the teeth thereon mesh with the teeth on the gear 19. The lower end of the steering post 15 is journaled in the housing 9 and the reinforcing bracket 12 and has secured to its upper end an ordinary steering wheel 23 whereby upon turning the steering wheel 23 the gear 19 is turned in a corresponding direction causing the segmental plate 22 to slide within the housing and turn the axle upon its fifth wheel 2.

While I have shown and described the preferred embodiment of my invention, it will be understood that minor changes in construction, combination and arrangement of parts may be made without departing from the spirit and scope of the invention as claimed.

What is claimed is:—

A steering device including a body having an axle pivoted thereto by a fifth wheel, a downwardly inclined bracket secured to the body, a housing secured to said bracket and supported in an inclined plane by the same and having an opening, a segmental plate passing through the opening and having its ends secured to the axle, teeth on said plate, a steering post extending into said housing, a conical shaped gear surrounding the post in the housing and in mesh with the teeth of the plate, a collar secured to the post and to the larger end of the gear and journaled in said housing, said gear having its apex journaled in the housing, an ear formed on said housing, and an arm secured to the ear and to the part of the fifth wheel carried by the body.

In testimony whereof I affix my signature in presence of two witnesses.

SAVINO GIACOLETTO.

Witnesses:
MARTIN GINETTI,
JOHN BROCCO.